Figure 1:
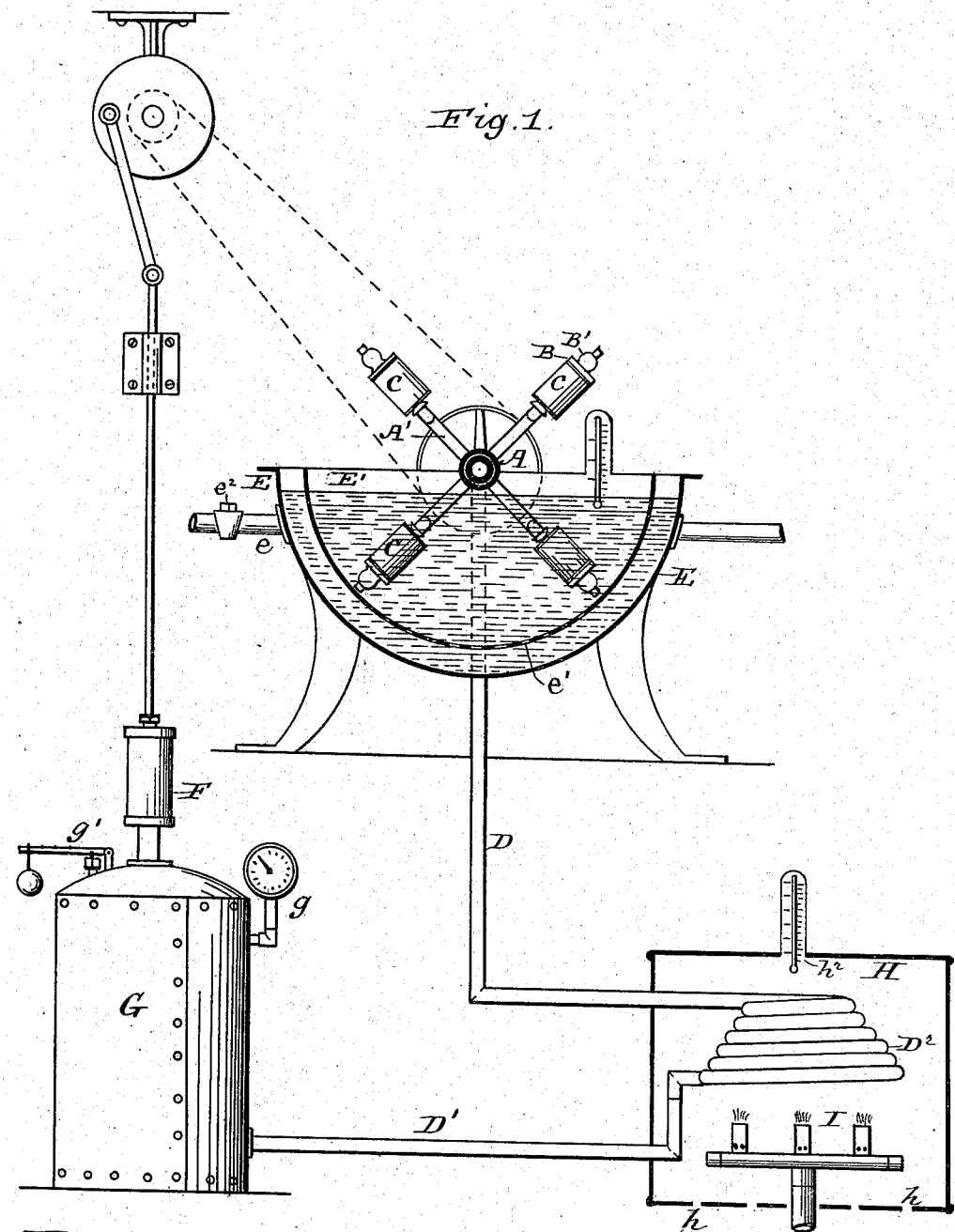

(No Model.)

W. B. MANN.

PROCESS OF AND APPARATUS FOR TESTING CANS.

No. 265,837. Patented Oct. 10, 1882.

Witnesses:
W. B. Masson
L. C. Hills

Inventor
William B. Mann
by E. E. Masson
atty.

(No Model.) 2 Sheets—Sheet 2.
W. B. MANN.
PROCESS OF AND APPARATUS FOR TESTING CANS.
No. 265,837. Patented Oct. 10, 1882.
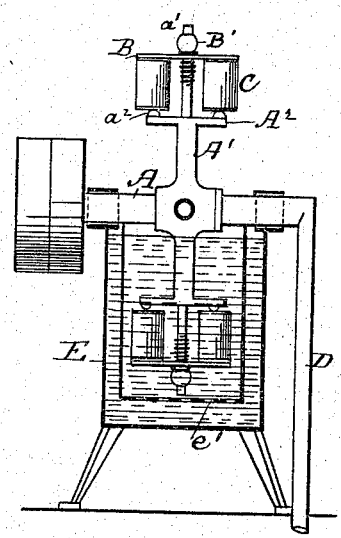
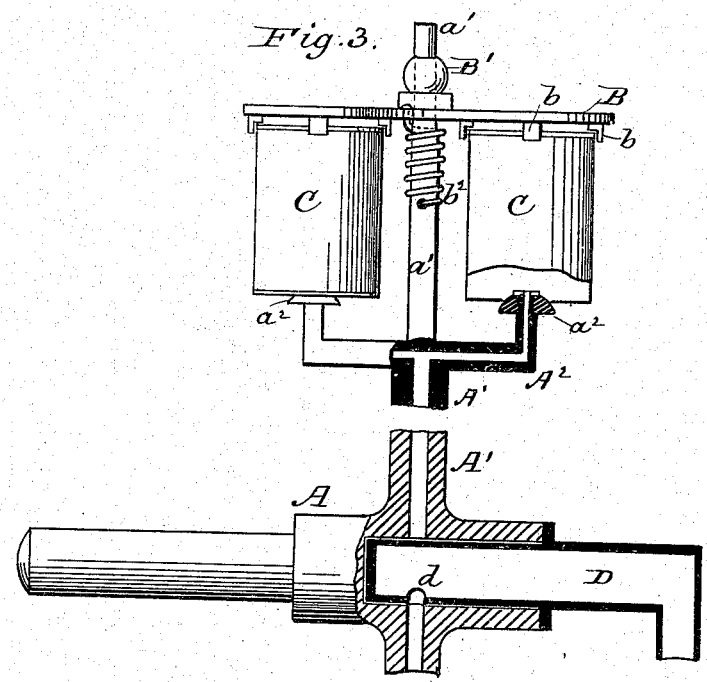
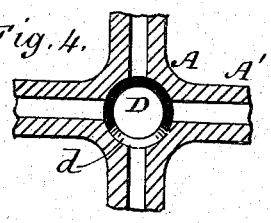
Witnesses:
W. B. Masson
L. C. Hills
Inventor
William B. Mann
by E. E. Masson
atty.

UNITED STATES PATENT OFFICE.

WILLIAM B. MANN, OF BALTIMORE, MARYLAND.

PROCESS OF AND APPARATUS FOR TESTING CANS.

SPECIFICATION forming part of Letters Patent No. 265,837, dated October 10, 1882.

Application filed June 29, 1882. (No model.)

*To all whom it may concern:*

Be it known that I, WILLIAM B. MANN, a citizen of the United States, residing at Baltimore, in the county of Baltimore and State of Maryland, have invented a new and useful process of and apparatus for testing sheet-metal packages or cans used in packing that class of materials known as "hermetically-sealed goods," of which the following is a specification.
The objects of my improvements are, first, to fill the cans, while temporarily closed, with compressed air, and while in that condition to submerge them beneath the surface of a liquid through which air-bubbles can ascend and indicate where a hole may be in the can; and, second, to heat the compressed air before it is admitted to the can. I attain these objects by the mechanism illustrated in the accompanying drawings, in which—
Figure 1 represents a vertical section of the apparatus. Fig. 2 is a transverse section of the water-tank and a portion of the apparatus. Fig. 3 represents on an enlarged scale, partly in side view and section, one of the can-holding arms and its shaft; and Fig. 4 is a transverse section of the hollow journal and the shaft with arms.

Heretofore compressed air has been used with can-testing machines, and imperfect cans have been reorganized by means of a pressure-gage, or by the peculiar action of the piston of an air-pump; but these machines differ from mine and do not indicate the precise location of a leak in a can.
In the accompanying drawings, A represents a shaft hollow in a portion of its length. This shaft has four hollow arms, A', and each arm has two hollow branches, $A^2$, having their extremity provided with a perforated semispherical washer, $a^2$, of india-rubber, of the proper size to stop the cap-hole of the can, and between these branches each arm A' has in line therewith a stem, a', upon which is mounted a plate, B, a little larger than the bottom of a pair of cans, C. The inner surface of each of these plates B is provided with a series of rubber blocks, b, to bear evenly against the bottom of the cans, and is made to press against the cans by means of the coiled spring $b^2$, having one end secured to said plate B and the other to the stem a'. Each plate B is also provided with a handle, B', by which it can be pulled outwardly while inserting cans between it and the semispherical washers $a^2$. Within the hollow end of the shaft A is placed one end of the pipe D, said pipe forming a journal-bearing for the shaft A and acting as the plug of a cock with the latter. The pipe D has a transverse slot, d, corresponding with the axis or tubular openings within the arms A'. This pipe D, as well as the shaft A, is received in journal-bearings secured to the sides of a semi-cylindrical tank, E, containing hot water. Compressed air or vapor is forced into the cans by means of an air-pump, F, operated either as shown in the drawings or in any other suitable manner. From the air-pump the compressed air passes into the receiver G, provided with a gage, g, to indicate the pressure, and with a safety-valve, g', set at the required pressure. From this receiver the compressed air is driven through the pipe D' into a coil, $D^2$, placed within a heating-chamber, H. This heating-chamber consists of a metallic box, of the proper size and shape, having in its base a series of apertures, h, for the entrance of air, and an opening, $h^2$, in the top for the escape of the products of combustion. A number of Bunsen burners, I, are arranged under the coil of pipe containing the compressed air to be heated, and a thermometer is placed in the top of the heating chamber to indicate the degree of heat therein. The air passing through the coil of pipe into the pipe D issues successively therefrom through the slot d into each one of the hollow arms carrying the cans while the latter are under water. There is within the tank E a similarly-shaped tank, E', having perforations e' in the bottom thereof, so that the water will readily pass from one to the other. This inner tank is simply to prevent air-bubbles that may be brought with a supply of fresh water through the pipe e into the outer tank from entering the inner tank and interfering with the examination of the cans passed through the water in the inner tank.

In operating with this machine two newly-made cans are clamped firmly between the rubber blocks b of the plates B and the rubber washers $a^2$ on the end of the tubes $A^2$, while said tubes $A^2$ stand vertically, or nearly so, above the shaft, by temporarily pulling upon the handle B' and then letting the spring $b^2$ retract the plate B. The shaft is then revolved a quarter of a revolution and two more cans secured in the same manner upon the adjoining tubes A². The shaft continuing to revolve, two more cans are placed upon the third pair of tubes A² while the first pair is passing under the water in the tank and is watched to see if air-bubbles are escaping, the air under a pressure of, say, thirty pounds per square inch in the tube D being at that moment allowed to pass through the slot d into the pipes A' and A² and within the cans. Each pair of cans is thus passed successively through the tank containing hot water. The water being kept heated by contact with the cans containing hot air, all the rosin is melted out of the seams, and should there be any point at which the solder has failed to take such point will readily be detected by the escaping bubbles, and the exact point where the leak is can be marked by the attendant for subsequent repair. The degree of heat of the water in the semi-cylindrical tank can be ascertained by the thermometer secured to the side thereof, and if it should become too warm cold water may be introduced through the pipe e and the amount be controlled by the cock e².

As it is desirable that the water in the tank should be at a temperature of nearly 200° Fahrenheit, hot water may first be used at the beginning of the operation, or burners may be used under the tank, or a steam-coil between the inner and outer tank. The heating-chamber H may also be heated with gasoline-burners or with steam-pipes.

Having now fully described my invention, I claim—

1. The process above described for testing sheet-metal packages, consisting of, first, stopping the cap of a can; second, filling it with hot air or vapor under pressure; and, finally, submerging the entire can beneath the surface of a liquid, substantially as and for the purposes described.

2. A machine for testing sheet-metal packages or cans, consisting of a mechanism to clamp the cans and connect them with a compressed-air supply, in combination with a tank adapted to contain a liquid to submerge them, substantially as and for the purpose described.

3. The combination of a water-tank, a revolving shaft having a series of hollow arms carrying clamps, and a pipe, D, with an air reservoir and pump, substantially as and for the purpose described.

4. The combination of a water-tank and a revolving shaft supported thereon, having a series of hollow arms carrying clamps, with a pipe, D, its heating-chamber, and an air-pump, substantially as and for the purpose described.

WM. B. MANN.

Witnesses:
GEO. A. HEMMICK,
HENRY W. FOX.